Aug. 18, 1931.  A. D. PENTZ  1,819,482
MASTER CYLINDER
Filed Jan. 31, 1928

Inventor
A. D. Pentz
By his Attorneys
Cooper, Kerr & Dunham

Patented Aug. 18, 1931

1,819,482

UNITED STATES PATENT OFFICE

ALBERT D. PENTZ, OF NEW YORK, N. Y., ASSIGNOR TO PENTZ MOTOR BRAKE CORPORATION, OF NEW BRIGHTON, NEW YORK, A CORPORATION OF NEW YORK

MASTER CYLINDER

Application filed January 31, 1928. Serial No. 250,861.

This invention pertains to hydraulic brakes of the kind used on automobiles, and has particular reference to the master cylinder which forms a part of many such brake systems.

Some of the problems in connection with hydraulic brakes are to care for fluid contraction and expansion, to prevent leakage of fluid from the system, to provide means for automatically replacing such leakage as does occur, and to remove air from the system.

The present invention is directed to the solution of those problems.

Further and other objects and advantages will be hereinafter set forth in the accompanying specification and claims, and shown in the drawings which by way of illustration show what is now considered to be the preferred embodiment of the invention.

Figure 1:
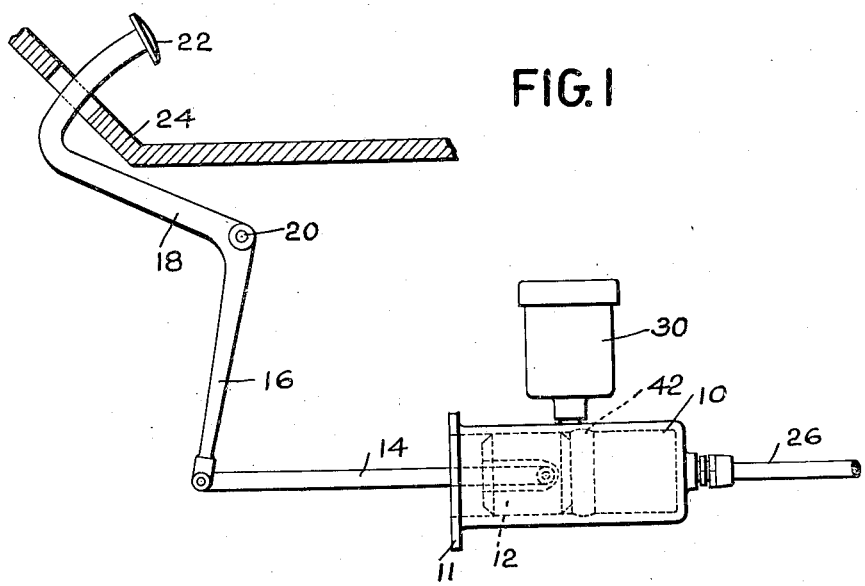
Fig. 1 shows, in somewhat diagrammatic form, the compensating or master cylinder and operative devices connected thereto.

The master cylinder 10, attached to the frame 9 of the car by bolts 13 through flange 11, contains a plunger 12 connected by link 14 to the lower arm 16 of brake lever 18 pivoted at 20 and terminating in a foot pedal 22 above the foot board 24 of the automobile. When pedal 22 is depressed by the operator, plunger 12 is moved to the right by link 14 and liquid, preferably oil, is forced from cylinder 10 under pressure through pipe 26 to the various actuating devices at the vehicle wheels. It will be understood that the entire brake apparatus has previously been filled with oil.

When pressure on the foot pedal is released, conical spring 28 within cylinder 10 forces plunger 12, link 14 and lever 18 back to normal position, at the same time withdrawing from pipe 26 the oil which had been forced thereinto by the previous forward movement of the plunger. This withdrawal of liquid is aided by the spring-returned plungers at the wheels of the vehicle.

An oil reservoir 30 is provided above the master cylinder and connected to the interior thereof by passage 32. Whenever plunger 12 is at the left end of its stroke, oil may flow from reservoir 30 into cylinder 10, thereby automatically replenishing any leakage from the master cylinder and compensating for any expansion or contraction.

Figure 2:
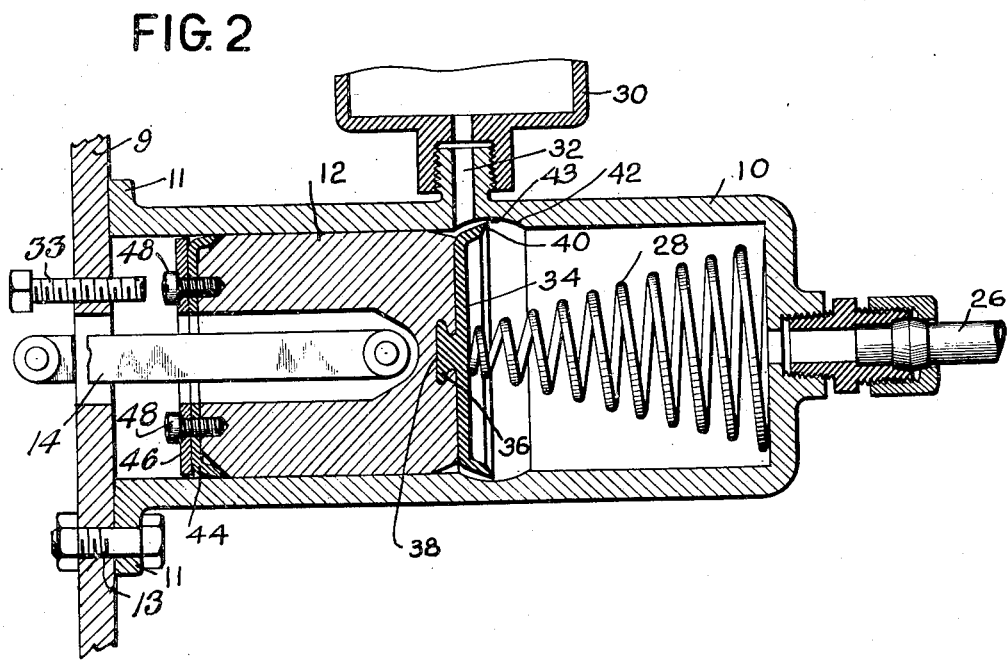
Fig. 2 is an enlarged cross-sectional view through the center of the compensating cylinder.

Former devices of this kind have used metallic packing rings around plunger 12 to permit safe passage of the packing back and forth across the lower end of passage 32. I have found that metallic rings are not as efficient as rubber or leather cup washers in preventing leakage past the plunger. The present arrangement has therefore been devised to allow the use of rubber cup packing while retaining the self-filling device. The right end of plunger 12 is fitted with the cup washer 34, held in place preferably by a button 36 formed on the rear of washer 34 and inserted in a socket 38 in plunger 12. Flange 40 of the washer projects toward the right. If flange 40 were required to travel across the orifice of pipe 32 the edge or lip of rim 40 would be damaged and quickly rendered useless. To overcome this condition I locate passage 32 so that lip 40 never passes the outlet of the passage, but is stopped by stop screw 33 just short of it whenever plunger 12 is at its extreme left hand position as shown in Fig. 2. In that position liquid may pass from passage 32 to the rear of the flange 40. In order that the entering liquid may pass to the right of lip 40 into the cylinder, the inner wall of the cylinder is counterbored as indicated at 42 to provide clearance 43 which permits liquid to pass the edge of the washer. The counterbore serves the additional purpose of permitting rim 40 to relax outwardly a trifle every time it enters the counterbore, thereby helping to maintain the resiliency of the cup washer and preventing it from taking a "set", thus aiding the washer in preserving its tightness while on its working stroke in the cylindrical portion of the master cylinder. It has been found that cup washers in ordinary master cylinders are prone to stick to the walls of the cylinder whenever the apparatus is idle for some time, as for instance when automobiles are shipped to foreign countries. The present design tends to prevent such sticking because in normal position the rim of the washer is in the counterbore and out of contact with the cylinder wall or in very light contact therewith. The shape of the counterbore has been somewhat distorted in the drawings, for the sake of clarity of illustration. It will be understood that the taper from the counterbore to the working portion of the cylinder is so gradual that lip 40 passes readily back and forth without injury.

At the left end of plunger 12 an additional cup washer 44 is secured by plate 46 and screws 48. This washer serves to catch any liquid which may have escaped to the left past the plunger. This entrapped oil serves to lubricate plunger 12. Plunger 12 is long enough so that washer 44 never reaches port 32.

It will be appreciated that any air entrapped in the system will escape through passage 32 and reservoir 30.

It is to be understood that the invention is not limited to the construction herein specifically illustrated but can be embodied in other forms without departure from its spirit as defined by the following claims.

I claim—

1. In a hydraulic brake for a vehicle, in combination, a master cylinder containing a fluid, a plunger arranged to reciprocate in said cylinder with a forward stroke and a return stroke, a cup washer on the forward end of said plunger, said washer having a forwardly projecting lip, a tapered counterbore in the wall of said cylinder into which said washer enters at the end of the return stroke, an elevated fluid reservoir and a passage connecting said reservoir to said counterbore at a point behind the rim of said washer at the end of its return stroke, whereby fluid may flow downwardly from said reservoir to said cylinder and air may pass upwardly from said cylinder to said reservoir for the purposes set forth.

2. In a hydraulic brake for a vehicle, in combination, a bored master cylinder, a plunger having a cup washer on its forward end and adapted to move back and forth in the bore of said cylinder, and a comparatively narrow tapered counter bore in said cylinder so placed that the cup washer may expand thereinto when said plunger is at the end of its back stroke.

In testimony whereof I hereto affix my signature.

ALBERT D. PENTZ.